(12) United States Patent
Haddad et al.

(10) Patent No.: US 11,577,721 B2
(45) Date of Patent: Feb. 14, 2023

(54) SYSTEM AND METHOD FOR DETECTING A RISK OF COLLISION BETWEEN A MOTOR VEHICLE AND A SECONDARY OBJECT LOCATED IN THE TRAFFIC LANES ADJACENT TO SAID VEHICLE WHEN CHANGING LANES

(71) Applicants: Renault s.a.s., Boulogne-Billancourt (FR); NISSAN MOTOR CO., LTD., Yokohama (JP)

(72) Inventors: Alain Haddad, Maurepas (FR); Geoffrey Bruno, Chatillon (FR); Etienne Menanteau, Paris (FR)

(73) Assignees: Renault s.a.s., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 258 days.

(21) Appl. No.: 16/964,790

(22) PCT Filed: Dec. 18, 2018

(86) PCT No.: PCT/EP2018/085612
§ 371 (c)(1),
(2) Date: Jul. 24, 2020

(87) PCT Pub. No.: WO2019/154549
PCT Pub. Date: Aug. 15, 2019

(65) Prior Publication Data
US 2021/0053560 A1    Feb. 25, 2021

(30) Foreign Application Priority Data
Feb. 8, 2018 (FR) ...................... 1851054

(51) Int. Cl.
*B60W 30/095* (2012.01)
*B60W 30/09* (2012.01)
(Continued)

(52) U.S. Cl.
CPC ..... *B60W 30/0953* (2013.01); *B60R 21/0132* (2013.01); *B60W 30/09* (2013.01);
(Continued)

(58) Field of Classification Search
CPC .. B60W 30/0953; B60W 30/09; B60W 50/14; B60W 2420/52; B60R 21/0132; B60R 2021/01327
(Continued)

(56) References Cited

U.S. PATENT DOCUMENTS 5,754,099 A    5/1998  Nishimura et al.
6,026,347 A *  2/2000  Schuster ................ G08G 1/164
                                                    342/71
(Continued)

FOREIGN PATENT DOCUMENTS

DE    195 11 210 A1    9/1995
DE    197 57 063 A1    6/1999
(Continued)

OTHER PUBLICATIONS

Ranjeet et al., "Neural network based lane change trajectory predictions for collision prevention," 2011, Publisher: IEEE.*
(Continued)

*Primary Examiner* — Tuan C To
(74) *Attorney, Agent, or Firm* — Oblon, McClelland, Maier & Neustadt, L.L.P.

(57) ABSTRACT

A method detects a risk of collision between a motor vehicle and a secondary object located in traffic lanes adjacent to the main traffic lane of the vehicle, in the event of a lane change by the vehicle, which involves detecting objects in a predetermined danger zone, and estimating a time-to-collision between the vehicle and a detected object. Detecting objects in a danger zone involves: calculating the actual distance between the vehicle and each object detected by the radar,
(Continued)

Figure 1:
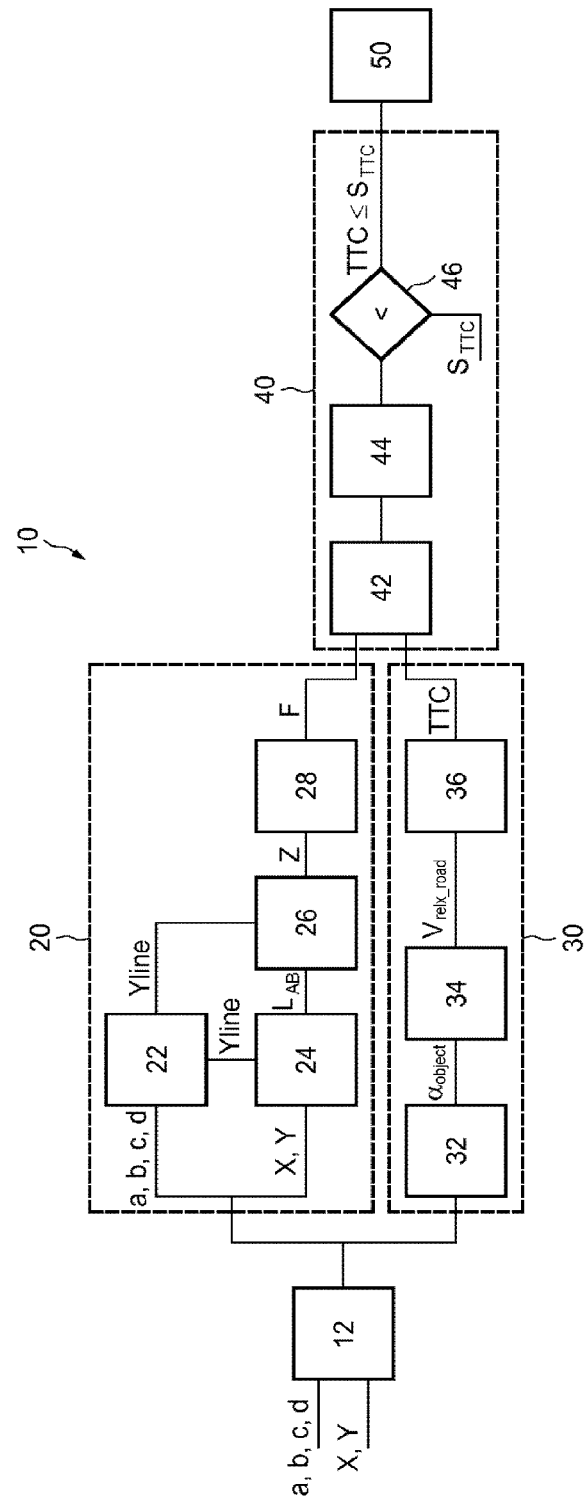

the actual distance corresponding to the length of an arc between two points; determining a danger zone as a function of lines of the main traffic lane and a width of the main traffic line; and checking, for each object detected by the radar, whether its coordinates are inside the predetermined danger zone.

9 Claims, 3 Drawing Sheets

(51) Int. Cl.
    *B60W 50/14*         (2020.01)
    *B60R 21/0132*     (2006.01)

(52) U.S. Cl.
    CPC ... *B60W 50/14* (2013.01); *B60R 2021/01327* (2013.01); *B60W 2420/52* (2013.01); *B60W 2554/80* (2020.02)

(58) Field of Classification Search
    USPC .......................................................... 701/301
    See application file for complete search history.

(56) References Cited

U.S. PATENT DOCUMENTS

| | | | |
|---|---|---|---|
| 6,304,811 B1 | 10/2001 | Prestl | |
| 9,827,985 B2 * | 11/2017 | Yoo | B60W 30/09 |
| 10,308,245 B2 * | 6/2019 | Lee | B60W 30/0956 |
| 10,324,463 B1 * | 6/2019 | Konrardy | G05D 1/0278 |
| 10,479,363 B2 * | 11/2019 | Miyata | B62D 15/0255 |
| 10,692,377 B1 * | 6/2020 | Kentley-Klay | G05D 1/0088 |
| 2007/0080825 A1 * | 4/2007 | Shiller | B62D 15/029 340/903 |
| 2009/0212930 A1 | 8/2009 | Pfeiffer et al. | |
| 2015/0042799 A1 | 2/2015 | Zhang et al. | |
| 2017/0072950 A1 * | 3/2017 | Sim | B60W 10/184 |
| 2017/0210383 A1 * | 7/2017 | Nishimura | B60W 30/09 |
| 2019/0071013 A1 * | 3/2019 | Adam | B60W 40/04 |

FOREIGN PATENT DOCUMENTS

| | | | | |
|---|---|---|---|---|
| DE | 102017001878 A1 * | 9/2017 | | B60Q 1/525 |
| WO | WO-2006092431 A1 * | 9/2006 | | B60Q 9/008 |
| WO | WO-2017168013 A1 * | 10/2017 | | B60W 30/18163 |
| WO | WO-2018015811 A1 * | 1/2018 | | G01C 21/28 |

OTHER PUBLICATIONS

Yong-Geon et al., "Lane Change and Path Planning of Autonomous Vehicles using GIS," 2015, Publisher: IEEE.*

Junsoo et al., "Curvilinear-Coordinate-Based Object and Situation Assessment for Highly Automated Vehicles," 2015, vol. 16, Publisher: IEEE.*

International Search Report dated Feb. 20, 2019 in PCT/EP2018/085612 filed on Dec. 18, 2018, 2 pages.

* cited by examiner

SYSTEM AND METHOD FOR DETECTING A RISK OF COLLISION BETWEEN A MOTOR VEHICLE AND A SECONDARY OBJECT LOCATED IN THE TRAFFIC LANES ADJACENT TO SAID VEHICLE WHEN CHANGING LANES

The present invention relates to the field of motor vehicle driving assistance, and in particular to obstacle avoidance assistance systems.

More particularly, the invention relates to methods and systems for detecting a risk of imminent collision between a vehicle situated in a main traffic lane and a mobile or immobile object situated in the traffic lanes adjacent to the main lane in the event of said vehicle changing lane.

Specifically, numerous accidents are caused by unintentionally leaving a lane following a drop in the driver's attention, or intentionally leaving a lane when the driver intends to overtake a vehicle ahead that is traveling at a speed slower than his own.

However, even in the case of intentionally leaving a lane, the driver may incorrectly estimate the distance between his vehicle and a mobile or immobile object situated in an adjacent lane, thereby possibly leading to a head-on collision with said object.

Some motor vehicles are nowadays equipped with active safety means capable of evaluating their trajectory and recognizing the surroundings in order to determine a risk of collision depending on the situation. Some actions may then be taken automatically or jointly with the driver of the vehicle in order to keep the vehicle in its traffic lane.

What are known as lane keeping assist (LKA in acronym form) systems that make it possible to automatically reposition the vehicle in its lane, or else what are known as lane departure warning (LDW in acronym form) systems that make it possible to warn the driver about leaving a lane, are known.

Reference may be made in this respect to document EP 2 042 399-A1, which proposes a system for assisting the driver of a main vehicle by calculating risks of collision with a secondary vehicle situated in the surroundings of the main vehicle.

Document US 2015 149 039-A1 is also known, this describing a lane keeping assistance system capable of calculating risks of collision with nearby vehicles.

However, such systems do not make it possible to calculate, in real time, the time to collision with a nearby vehicle in the case of a bend.

There is a need to improve driving assistance methods and systems in order to offer the driver detection of an imminent collision with an adjacent vehicle, which detection is as safe as possible, taking into account the shape of the lane by distinguishing a straight line from a bend.

The aim of the present invention is therefore to provide a method and system for detecting a risk of imminent collision with a mobile or immobile object situated in lanes adjacent to the main lane.

One subject of the invention is a system for detecting a risk of collision between a motor vehicle and a secondary object situated in traffic lanes adjacent to the main traffic lane of said motor vehicle, in the event of said vehicle changing lane, said motor vehicle comprising detection means comprising in particular at least one perception sensor, for example an infrared camera, directed onto the main lane ahead of the vehicle, making it possible to acquire the coefficients of the lane boundary lines necessary to virtually reconstruct the main lane, and at least one frontal or lateral radar for detecting the coordinates of each secondary object situated in the field of view of the radar.

The system for detecting a risk of collision comprises a module for detecting objects in a determined danger area, having a module for calculating an actual distance between the motor vehicle and each object detected by the radar corresponding to the length of a segment between two points, regardless of the shape of the lane, in the form of a straight line or curve, a module for determining a danger area on the basis of the lines of the main lane and the width of the main lane, and a module for checking, for each object detected by the radar, whether its coordinates are situated in the danger area determined beforehand, and transmits a flag value for each object detected in the danger area to a computer.

The actual distance is given by transforming the distance transmitted by the radar corresponding to the distance as the crow flies between the motor vehicle and each object detected by the radar.

The flag is for example a binary true or false value associated with the lane in question, true denoting the presence of an object in the adjacent lane, false denoting the absence of an object in the adjacent lane.

The collision detection system furthermore comprises a time to collision estimation module.

The system is thus able to detect an object in the adjacent lanes to the right and to the left of the main lane in which the motor vehicle is traveling and calculate an actual distance between a motor vehicle and an object regardless of the rectilinear or curved shape of the traffic lane.

The time to collision estimation module advantageously comprises a module for calculating an angle between the motor vehicle and the detected object, under the assumption that the trajectory of the object is parallel to the main lane, a module for projecting the relative speeds transmitted by the radar onto the axis of the road in order to obtain a relative speed that follows the road in order to utilize these data regardless of the shape of the road, and a module for calculating the time to collision for each object detected by the radar for each detected object on the basis of the actual distance and the relative speed.

For example, the danger area comprises a first area portion defined by two substantially parallel lines that follow the traffic lane and that are spaced transversely by a first distance calculated on the basis of the widths of adjacent lanes given by the camera, or on the basis of a reference lane width, and a second area portion defined by two lines that are inclined toward one another with respect to the first lines and that are spaced transversely by a second distance less than the first distance, making it possible to reduce detection errors of the radar over long distances. Specifically, by reducing the distance between the lines of the second danger area, the lateral offset of the detected object before it is considered to be situated in the danger area is increased.

The total length of the danger area is fixed regardless of the shape of the traffic lane of the vehicle, and predetermined in the computer by the manufacturer.

Advantageously, the system furthermore comprises a module for filtering the objects detected by the radar in order to identify the most critical of them on the basis of the flags for flagging the presence of objects in the danger area and the times to collision.

For example, the module for filtering the detected objects comprises a first filter retaining only the detected objects whose flag is true, that is to say the objects situated in the danger area, a module for determining the most critical object situated in the danger area on the basis of the distance from the vehicle and/or the time to collision, and a module for comparing the time to collision with the most critical object with a threshold value. By way of nonlimiting example, the module for filtering the detected objects could comprise a module that retains only moving objects.

The system may also comprise a warning module that transmits a signal warning of the presence of a critical object to the driver by indicating the time to collision with the most critical object when the time to collision with the most critical object is less than or equal to said threshold value.

The system thus makes it possible to isolate an object considered to be critical and to output a warning signal and/or intervention signal in the event of the risk of presence of a critical object, and thus an imminent risk of collision with said targeted object.

It is also possible to provide a module capable of taking control of the vehicle controls in order to reposition said vehicle in its main traffic lane. Such a module will not be described further, however.

According to a second aspect, the invention relates to a motor vehicle comprising a computer and a system as described above for detecting a risk of collision between said motor vehicle and a secondary object situated in the traffic lanes adjacent to the main traffic lane of said motor vehicle in the event of said vehicle changing lane.

According to a third aspect, the invention relates to a method for detecting a risk of collision between a motor vehicle and a secondary object situated in the traffic lanes adjacent to the main traffic lane of said motor vehicle, said motor vehicle comprising detection means comprising in particular at least one perception sensor, for example an infrared camera, directed onto the main lane ahead of the vehicle, making it possible to acquire the coefficients of the lane boundary lines necessary to virtually reconstruct the main lane, and at least one frontal or lateral radar for detecting the coordinates of each secondary object situated in the field of view of the radar.

According to the method, the presence of objects in a determined danger area is detected, and a time to collision between the vehicle and a detected object is estimated.

Advantageously, in order to detect the presence of objects in a danger area, the actual distance between the motor vehicle and each object detected by the radar, given by transforming the distance transmitted by the radar corresponding to the distance as the crow flies between the motor vehicle and each object detected by the radar, is calculated, the actual distance corresponding to the length of an arc between two points regardless of the shape of the lane, in the form of a straight line or curve, a danger area is determined on the basis of the lines of the main lane and the width of the main lane, and it is checked, for each object detected by the radar, whether its coordinates are situated in the determined danger area, and a flag value for each object detected in the danger area is transmitted to the computer.

The actual distance is given by transforming the distance transmitted by the radar corresponding to the distance as the crow flies between the motor vehicle and each object detected by the radar.

The flag is for example a binary true or false value associated with the lane in question, true denoting the presence of an object in the adjacent lane, false denoting the absence of an object in the adjacent lane.

In the step of estimating a time to collision, it is possible to calculate an angle between the motor vehicle and the detected object, under the assumption that the trajectory of the object is parallel to the main lane, it is possible to calculate the relative speed as the projection, onto the axis of the road, of the relative speeds transmitted by the radar in order to utilize these data regardless of the shape of the road, and it is possible to calculate the time to collision for each object detected by the radar for each detected object on the basis of the actual distance and the relative speed.

Advantageously, the most critical detected object is determined by filtering the detected objects whose flag is true, that is to say the objects situated in the danger area, and by determining the most critical of them on the basis of the distance from the vehicle and/or the time to collision.

It is also possible to compare the time to collision with the most critical object with a threshold value, and when the time to collision with the most critical object is less than or equal to said threshold value, a signal warning of the presence of a critical object and thus of a risk to the driver is output, by indicating for example the time to collision with the most critical object.

Figure 2:
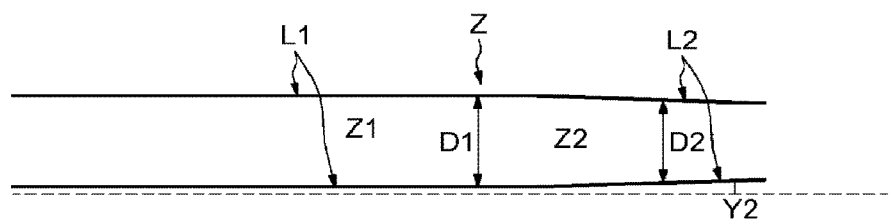
Figure 3:
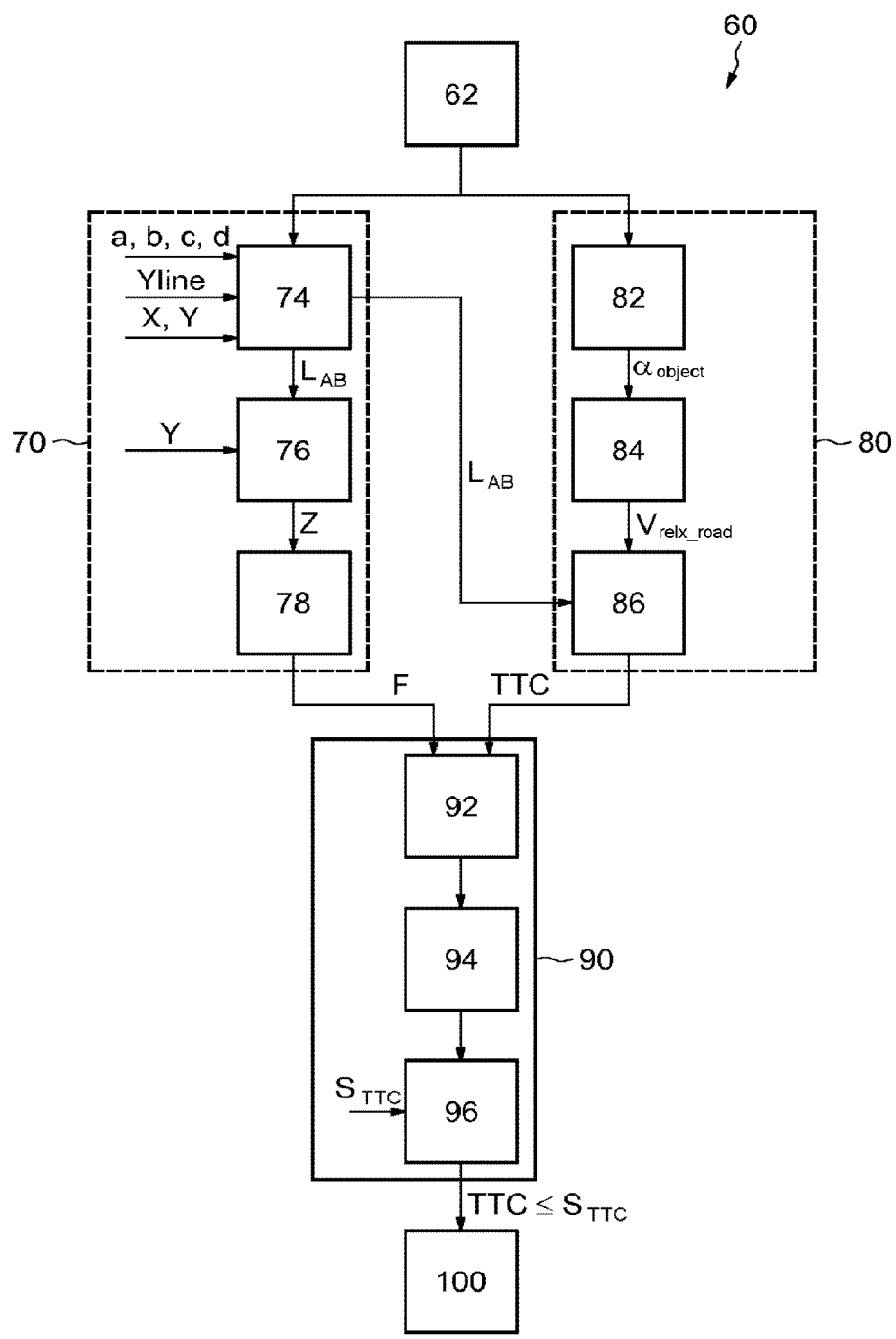

Other aims, features and advantages of the invention will become apparent on reading the following description, given solely by way of nonlimiting example and with reference to the appended drawings, in which:

FIG. 1 schematically shows a system for detecting a risk of collision between a motor vehicle and a secondary object according to the invention;

FIG. 2 schematically illustrates the danger area determined by the system from FIG. 1 for detecting a risk of collision; and FIG. 3 illustrates the steps of a method for detecting a risk of collision according to the invention, implemented by the system of FIG. 1.

FIG. 1 shows, very schematically, a system for detecting a risk of collision between a motor vehicle and a secondary object situated in the traffic lanes adjacent to the main traffic lane of said motor vehicle in the event of said vehicle changing lane, that is to say when said vehicle moves from the main traffic lane to an adjacent traffic lane.

"Secondary object" is understood to mean an immobile object, such as a safety barrier, or a mobile object, such as a secondary motor vehicle moving in the same direction or in the opposite direction to the main vehicle.

The system 10 for detecting a risk of collision comprises a module 12 for recovering data originating from detection means (not shown) provided on the motor vehicle.

The detection means comprise in particular at least one perception sensor, for example an infrared camera, directed onto the main lane ahead of the vehicle, making it possible to acquire the coefficients a, b, c, d of the lane boundary lines necessary to virtually reconstruct the main lane.

The detection means also comprise at least one frontal or lateral radar (not shown) for detecting the coordinates X, Y of each secondary object situated in the field of view of the radar.

The system 10 for detecting a risk of collision furthermore comprises a module 20 for detecting objects in a determined danger area Z and a module 30 for estimating a time to collision.

As illustrated in FIG. 1, the module 20 for detecting objects in a determined danger area Z comprises a module 22 for reconstructing the equation of the road Yline from the coefficients a, b, c, d using the following equation:

$$Y\text{line} = d \cdot x^3 + c \cdot x^2 + b \cdot x + a \tag{Eq. 1}$$

where:
a, b, c, d are the coefficients characterizing the line of the lane transmitted by the camera; and x is the longitudinal distance.

The module 20 for detecting objects in a determined danger area Z then comprises a module 24 for calculating the actual distance $L_{AB}$ between the motor vehicle and each object detected by the radar.

The actual distance $L_{AB}$ is given by transforming the distance X transmitted by the radar corresponding to the distance as the crow flies between the motor vehicle and each object detected by the radar.

The actual distance $L_{AB}$ corresponds to the length of an arc between two points A, B according to the following Cartesian equation:

$$L_{AB} = \int_{x_A}^{x_B} \sqrt{1 + Yline'^2} \cdot dx \qquad \text{(Eq. 2)}$$

where:
taking the longitudinal axis of a vehicle radar as reference, $x_A$ is the longitudinal position of the vehicle with respect to the origin of the radar,
$x_B$ is the position, on this same axis, of the object detected by the radar, and
Yline' is the derivative of Yline.
By writing:

$$f(x) = \sqrt{1 + Yline'^2} = \sum_{i=0}^{3} a_i \cdot (x - x_0)^i + o \cdot ((x - x_0)'') = g(x) \qquad \text{(Eq. 3)}$$

$$\text{where}: x_0 = \frac{x_A + x_B}{2}; \text{ and}$$

$$o \cdot ((x - x_0)'' = \varepsilon(x), \text{ where } \lim_{x \to x_0; x \neq x_0} \frac{\varepsilon(x)}{(x - x_0)''} = 0$$

the actual distance $L_{AB}$ is thus obtained using the following equation:

$$L_{AB} = \int_{x_A}^{x_B} g(x) \cdot dx \qquad \text{(Eq. 4)}$$

The actual distance $L_{AB}$ thus calculated corresponds to the length of a segment between two points A and B, regardless of the shape of the lane, in the form of a straight line or curve.

The module 20 for detecting objects in a determined danger area Z comprises a module 26 for determining a danger area Z.

The danger area Z, illustrated in detail in FIG. 2, comprises a first area portion Z1 defined by two lines L1 that are substantially parallel and that follow the traffic lane, the two lines L1 being spaced transversely by a distance D1 calculated on the basis of the widths of adjacent lanes given by the camera, or on the basis of a reference lane width.

The danger area Z comprises a second area portion Z2 defined by two lines L2 that are inclined toward one another with respect to the first lines L1 so as to form a beveled shape. The two lines L2 are spaced transversely by a distance D2, making it possible to reduce the detection errors of the radar over long distances. Specifically, by reducing the distance between the lines of the second danger area Z2, the lateral offset Y2 of the detected object before it is considered to be situated in the danger area Z is increased.

The total length of the danger area Z is fixed regardless of the shape of the traffic lane of the vehicle, and predetermined in the computer by the manufacturer.

The object detection module 20 comprises a module 28 for checking, for each object detected by the radar, whether its coordinates ($L_{AB}$, Y) are situated in the danger area Z determined beforehand.

For each object detected in the danger area Z, a flag F is raised. The flag is for example a binary true or false value associated with the lane in question, true denoting the presence of an object in the adjacent lane, false denoting the absence of an object in the adjacent lane.

As illustrated in FIG. 1, the module 30 for estimating a time to collision TTC comprises a module 32 for calculating an angle $\alpha_{object}$ between the motor vehicle and the detected object, under the assumption that the trajectory of the object is parallel to the main lane. The angle $\alpha_{object}$ is defined by the following equation:

$$\alpha_{object} = d \cdot x^2 + c \cdot x + b \qquad \text{(Eq. 5)}$$

The module 30 furthermore comprises a module 34 for transforming the relative speeds $V_{relx}$, $V_{rely}$ in terms of x and y, transmitted by the radar in order to utilize these data regardless of the shape of the road.

The relative speeds $V_{relx}$, $V_{rely}$ in terms of x and y of the detected object that are transmitted by the radar are thus projected onto the axis of the road in order to obtain a relative speed $V_{relx\_road}$ that follows the road using the following equation:

$$V_{relx\_road} = \cos(\alpha_{object}) \cdot V_{relx} + \sin(\alpha_{object}) \cdot V_{rely} \qquad \text{(Eq. 6)}$$

The module 30 for estimating the TTC lastly comprises a module 34 for calculating the time to collision TTC for each object detected by the radar for each detected object using the following equation:

$$TTC = \frac{L_{AB}}{V_{relx\_road}} \qquad \text{(Eq. 7)}$$

The collision detection system 10 furthermore comprises a module 40 for filtering the objects detected by the radar in order to identify the most critical of them.

The module 40 for filtering the detected objects thus receives a set of flag vectors $F_1$ flagging the presence of objects in the danger area Z, as well as the times to collision $TTC_i$ with the detected objects, where i is an integer between 1 and n.

The filtering module 40 comprises a first filter 42 retaining only the detected objects whose flag is true, that is to say the objects situated in the danger area Z.

By way of nonlimiting example, the module 40 for filtering the detected objects could comprise a module that retains only moving objects.

The filtering module 40 comprises a module 44 for determining the most critical object situated in the danger area Z on the basis of the distance $L_{AB}$ from the vehicle and/or the time to collision TTC.

The filtering module 40 then comprises a module 46 for comparing the time to collision TTC with the most critical object with a threshold value $S_{TTC}$. If the time to collision TTC with the most critical object is less than or equal to said threshold value $S_{TTC}$, a warning module 50 transmits a signal warning of the presence of a critical object to the driver, indicating the time to collision TTC with the most critical object.

It is also possible to provide a module capable of taking control of the vehicle controls in order to reposition said vehicle in its main traffic lane. Such a module will not be described further, however.

FIG. 3 shows a flowchart for implementing a method 60 for detecting a risk of collision between a motor vehicle and a secondary object situated in the traffic lanes adjacent to the main traffic lane of said motor vehicle in the event of the vehicle changing lane from the main lane to an adjacent lane.

In a first step 62, the data originating from detection means (not shown) provided on the motor vehicle are recovered.

The detection means in particular comprise at least one perception sensor, for example an infrared camera, directed onto the main lane ahead of the vehicle, making it possible to acquire the coefficients a, b, c, d of the lane boundary lines necessary to virtually reconstruct the main lane.

The detection means also comprise at least one frontal or lateral radar (not shown) for detecting the coordinates X, Y of each secondary object situated in the field of view of the radar.

In parallel, objects are detected in a danger area Z in step 70, and a time to collision between the vehicle and a detected object is estimated in step 80.

The most critical detected object is determined in a step 90, and lastly a warning signal is output in the event of the presence of a critical object in step 100.

In step 70 of detecting objects in a danger area Z, the actual distance $L_{AD}$ between the motor vehicle and each object detected by the radar, given by transforming the distance X transmitted by the radar corresponding to the distance as the crow flies between the motor vehicle and each object detected by the radar, is calculated.

The actual distance $L_{AB}$ corresponds to the length of an arc between two points A, B according to equation 2:

$$L_{AB} = \int_{x_A}^{x_B} \sqrt{1 + Yline'^2} \cdot dx \qquad (Eq. 2)$$

where:

taking the longitudinal axis of a vehicle radar as reference, $x_A$ is the longitudinal position of the vehicle with respect to the origin of the radar, $x_B$ is the position, on this same axis, of the object detected by the radar, and Yline' is the derivative of Yline determined using equation Eq. 1.

By writing:

$$f(x) = \sqrt{1 + Yline'^2} = \sum_{i=0}^{3} a_i \cdot (x - x_0)^i + o \cdot ((x - x_0)^n) = g(x) \qquad (Eq. 3)$$

$$\text{where}: x_0 = \frac{x_A + x_B}{2}; \text{ and}$$

$$o \cdot ((x - x_0)^n = \varepsilon(x), \text{ where } \lim_{x \to x_0; x \neq x_0} \frac{\varepsilon(x)}{(x-x_0)^n} = 0$$

the actual distance $L_{AB}$ is thus obtained using the following equation:

$$L_{AB} = \int_{x_A}^{x_B} g(x) \cdot dx \qquad (Eq. 4)$$

The actual distance $L_{AB}$ thus calculated corresponds to the length of a segment between two points A and B, regardless of the shape of the lane, in the form of a straight line or curve.

Next, in step 76, a danger area Z is determined, this being illustrated in detail in FIG. 2, comprising a first area portion Z1 defined by two substantially parallel lines L1 that follow the traffic lane, the two lines L1 being spaced transversely by a distance D1 or offset calculated on the basis of the widths of adjacent lanes given by the camera, or on the basis of a reference lane width.

The danger area Z comprises a second area portion Z2 defined by two lines L2 that are inclined toward one another with respect to the first lines L1 so as to form a beveled shape. The two lines L2 are spaced transversely by a distance D2, making it possible to reduce the detection errors of the radar over long distances. Specifically, by reducing the distance between the lines of the second danger area Z2, the lateral offset Y2 of the detected object before it is considered to be situated in the danger area Z is increased.

The total length of the danger area Z is fixed regardless of the shape of the traffic lane of the vehicle, and predetermined in the computer by the manufacturer.

It is then checked in step 78, for each object detected by the radar, whether its coordinates Y) are situated in the danger area Z determined beforehand in step 76.

For each object detected in the danger area Z, a flag F is raised. The flag is for example a binary true or false value associated with the lane in question, true denoting the presence of an object in the adjacent lane, false denoting the absence of an object in the adjacent lane.

As illustrated in FIG. 3, in step 80 of estimating a time to collision TTC, in step 82, an angle $\alpha_{object}$ between the motor vehicle and the detected object is calculated, under the assumption that the trajectory of the object is parallel to the main lane. The angle $\alpha_{object}$ is defined by the following equation:

$$\alpha_{object} = d \cdot x^2 + c \cdot x + b \qquad (Eq. 5)$$

The relative speed $V_{relx\_road}$ is then calculated in step 84 as the projection, onto the axis of the road, of the relative speeds $V_{relx}$, $V_{rely}$ in terms of x and y, transmitted by the radar in order to utilize these data regardless of the shape of the road.

A relative speed $V_{relx\_road}$ that follows the road is thus obtained using the following equation:

$$V_{relx\_road} = \cos(\alpha_{object}) \cdot V_{relx} + \sin(\alpha_{object}) \cdot V_{rely} \qquad (Eq. 6)$$

The time to collision TTC is lastly calculated for each object detected by the radar for each detected object using the following equation:

$$TTC = \frac{L_{AB}}{V_{relx\_road}} \qquad (Eq. 7)$$

In step 90 of determining the most critical detected object, in step 92, the detected objects whose flag is true, that is to say the objects situated in the danger area Z, are filtered.

By way of nonlimiting example, only moving objects could also be retained.

The most critical object situated in the danger area Z is then determined in step 94 on the basis of the distance $L_{AB}$ from the vehicle and/or the time to collision TTC, and the time to collision TTC with the most critical object is compared with a threshold value $S_{TTC}$ in step 96. If the time to collision TTC with the most critical object is less than or equal to said threshold value $S_{TTC}$, a signal warning of the presence of a critical object is output to the driver in step 100, indicating the time to collision TTC with the most critical object.

Thus, by virtue of the invention, it is possible to detect an object in the adjacent lanes to the right and to the left of the main lane in which the motor vehicle is traveling.

It is also possible to calculate an actual distance between a motor vehicle and an object regardless of the rectilinear or curved shape of the traffic lane.

Lastly, the present invention makes it possible to isolate an object considered to be critical and to output a warning signal and/or intervention signal in the event of the presence of a critical object.

The invention claimed is:

1. A system for detecting a risk of collision between a motor vehicle and a secondary object situated in traffic lanes adjacent to a main traffic lane of said motor vehicle, in response to said motor vehicle changing lane, said motor vehicle comprising a detector that includes at least one perception sensor directed onto the main traffic lane, and configured to acquire coefficients of lane boundary lines to virtually reconstruct the main traffic lane, and at least one frontal or lateral radar to detect coordinates of each secondary object situated in a field of view of the radar, the system comprising:
   processing circuitry configured to
      detect secondary objects in a determined danger area,
      calculate an actual distance between the motor vehicle and each secondary object detected by the radar corresponding to a length of a segment between two points,
      determine a danger area based on the boundary lines of the main traffic lane and a width of the main traffic lane,
      check, for each secondary object detected by the radar, whether coordinates of the secondary object are situated in the danger area determined beforehand,
      transmit a flag value for each secondary object detected in the danger area to a computer,
      estimate a time to collision for each secondary object detected in the danger area, and
      filter the secondary objects detected by the radar to identify a most critical secondary object of the secondary objects, based on the flag values for flagging presence of secondary objects in the danger area and the times to collision.

2. The system as claimed in claim 1, wherein the processing circuitry is configured to calculate an angle between the motor vehicle and the detected secondary object, project relative speeds transmitted by the radar onto an axis of a road in order to obtain a relative speed that follows the road, and calculate the time to collision for each secondary object detected by the radar for each detected secondary object based on the actual distance and the relative speed.

3. The system as claimed in claim 1, wherein the danger area comprises a first area portion defined by two substantially parallel lines that follow the traffic lane and that are spaced transversely by a first distance and a second area portion defined by two lines that are inclined toward one another with respect to the first lines and that are spaced transversely by a second distance less than the first distance.

4. The system as claimed in claim 1, wherein the processing circuitry is configured to filter the secondary objects by applying a first filter retaining only the detected secondary objects situated in the danger area and determining the most critical secondary object based on the distance from the vehicle and/or the time to collision, and comparing the time to collision with the most critical secondary object with a threshold value.

5. The system as claimed in claim 4, wherein the processing circuitry is configured to transmit a signal warning of the presence of a critical secondary object to the driver by indicating the time to collision with the most critical secondary object when the time to collision with the most critical secondary object is less than or equal to said threshold value.

6. A motor vehicle comprising:
   the system as claimed in claim 1; and
   the computer.

7. A method for detecting a risk of collision between a motor vehicle and a secondary object situated in traffic lanes adjacent to a main traffic lane of said motor vehicle, in response to said motor vehicle changing lane, said motor vehicle comprising a detector that includes at least one perception sensor directed onto the main traffic lane and configured to acquire coefficients of lane boundary lines necessary to virtually reconstruct the main traffic lane, and at least one frontal or lateral radar for detecting coordinates of each secondary object situated in a field of view of the radar, the method comprising:
   detecting a presence of objects in a determined danger area; and
   estimating a time to collision between the vehicle and each detected object,
   wherein the detecting the presence of objects in a danger area includes:
      calculating an actual distance between the motor vehicle and each object detected by the radar, given by transforming a distance transmitted by the radar corresponding to a straight line distance between the motor vehicle and each object detected by the radar, the actual distance corresponding to a length of an arc between two points,
      determining a danger area based on the lines of the main traffic lane and a width of the main traffic lane,
      checking, for each object detected by the radar, whether coordinates of the object are situated in the determined danger area,
      transmitting a flag value for each object detected in the danger area to a computer, and
      filtering the secondary objects detected by the radar to identify a most critical secondary object of the secondary objects, based on the flag values for flagging presence of secondary objects in the danger area and the times to collision.

8. The method as claimed in claim 7, wherein the estimating the time to collision includes calculating an angle between the motor vehicle and the detected object, calculating a relative speed as a projection, onto an axis of a road, of the relative speeds transmitted by the radar, and calculating the time to collision for each object detected by the radar for each detected object based on the actual distance and the relative speed.

9. The method as claimed in claim 7, wherein the time to collision with the most critical object is compared with a threshold value and, when the time to collision with the most critical object is less than or equal to said threshold value, a signal warning of the presence of a critical object is output to the driver.

\* \* \* \* \*